United States Patent [19]
Horiuchi

[11] Patent Number: 4,498,436
[45] Date of Patent: Feb. 12, 1985

[54] AUXILIARY AIR SUPPLYING APPARATUS FOR AN INTERNAL COMBUSTION ENGINE

[75] Inventor: Tomofusa Horiuchi, Yokohama, Japan

[73] Assignee: Nissan Motor Company, Limited, Yokohama, Japan

[21] Appl. No.: 490,227

[22] Filed: Apr. 29, 1983

[30] Foreign Application Priority Data

May 7, 1982 [JP] Japan .............................. 57-66165[U]

[51] Int. Cl.³ ............................................ F02M 23/04
[52] U.S. Cl. .................................... 123/339; 123/340; 123/585; 123/587; 123/588
[58] Field of Search ............................... 123/585–589, 123/339, 349, 341, 442, 432, 478

[56] References Cited

U.S. PATENT DOCUMENTS

| 4,377,150 | 3/1983 | Kitamura et al. | 123/588 |
| 4,385,603 | 5/1983 | Bonse et al. | 123/339 |
| 4,387,682 | 6/1983 | Miyagi et al. | 123/339 |
| 4,399,789 | 8/1983 | Yano | 123/339 |

Primary Examiner—William A. Cuchlinski, Jr.
Attorney, Agent, or Firm—Schwartz, Jeffery, Schwaab, Mack, Blumenthal & Koch

[57] ABSTRACT

An auxiliary air supplying apparatus for an internal combustion engine to bypass throttle valves in an intake passageway comprises an air box communicable with the intake passageway upstream of the throttle valves, a plurality of passageways branched in parallel from the air box and connected to the intake passageway downstream of the throttle valves and means for controlling the flow rate of the air which flows through the passageways in accordance with the load conditions of the engine.

11 Claims, 14 Drawing Figures

AUXILIARY AIR SUPPLYING APPARATUS FOR AN INTERNAL COMBUSTION ENGINE

BACKGROUND OF THE INVENTION

This invention relates to an auxiliary air supplying apparatus for an internal combustion engine for motor vehicles or the like.

Generally, in internal combustion engines for automobiles, the idling air to gas ratio is lean when the intake throttle valve is closed, or when auxiliary apparatus such as an air conditioner or the like are operated while the engine is idling. To prevent this lean mixture from occuring in the above mentioned cases, additional devices other than the throttle valves are necessitated to supply sufficient auxiliary air to the engine.

FIG. 1 illustrates an example of such a conventional internal combustion engine which is equipped with an electronically controlled fuel injection apparatus. Such engines are set forth, e.g. in Japanese Public Disclosure No. SHO 55-57641 and Japanese Utility Model Publication No. SHO 53-52993.

In FIG. 1, the air enters through an air cleaner 1 and is supplied to an engine 2 through an intake passageway 3. A throttle chamber 4 is provided along the intake passageway 3. Throttle valves 15 and 16 are provided in the throttle chamber 4. The throttle chamber 4 also has a bypass passageway 6 formed therein for allowing air to bypass the throttle valves 15 and 16. An adjusting screw 7 is externally inserted into the bypass passageway 6 for controlling the amount of air flowing therethrough thereby controlling the rotating speed of the engine while idling. In other words, the effective cross sectional area in the bypass passageway 6 through which additional air is allowed to flow is increased or decreased depending upon the shut-off degree of the adjusting screw 7, so that an appropriate quantity of idling air is securely adjusted for.

The intake passageway 3 is further formed with another bypass passageway 8. One end of the bypass passageway 8 is conected to an upstream side of the intake passageway 3, (on the right side of the throttle valves 15 and 16 in FIG. 1.) and the other end thereof is divided into two passageways, each of which is connected along a downstream side of the intake passageway 3 (on the left side of the throttle valves 15 and 16 in FIG. 1). A pair of electro magnetic valves 9 and 10 are attached to a branch portion of the bypass passageway 8. The electro magnetic valves 9 and 10 are respectively opened when the electrical load on the engine increases (for example, when the head lights are turned ON, the air conditioner is turned ON, etc.), so that the bypass passageway 8 is communicated with the intake passageway 3 thereby allowing additional auxiliary air to flow from the upstream to the downstream side of the intake passageway 3.

In the above described construction, additional auxiliary air is supplied to the engine 2 through the bypass passageway 8 which bypasses the throttle valves 15 and 16. Consequently, additional air may be supplemented during engine idling to compensate for an increased electrical load condition. Hence, a desired idling rotating speed can be assured.

Furthermore, the intake passageway 3 is also formed with a bypass passageway 11 which also bypasses the throttle chamber 4. An air regulator 13 is interposed in the bypass passageway 11 and is opened or closed in response to the temperature of engine cooling water which circulates in a hot water radiating passageway 12 formed along the intake passageway 3. While the engine is being warmed-up during cold circumstances, the above-mentioned air regulator 13 is opened to allow the bypass passageway 11 to communicate with the intake passageway 3.

Consequently, at low temperatures, the air intake during idling is increased by supplementary auxiliary air being fed through the bypass passageway 11 to the engine; therefore, the idling rotating speed increases to promote the warming-up of the engine.

The intake passageway 3 is further formed with another bypass passageway 14 having a negative pressure control valve 5 formed therein. The valve 5 is opened when the intake negative pressure exceeds a predetermined value at the time of deceleration, thereby allowing bypass auxiliary air to flow through the bypass passageway 14 from the upstream to the downstream side of the intake passageway 3. Thus, an excessive increase of intake negative pressure is compensated for and a reduction in the idling speed of the engine is thereby prevented.

As described above, a regulated amount of auxiliary air is supplied to the engine 2 by utilizing extra devices other than the throttle valves 15 and 16 in accordance with load conditions on the engine, engine temperature, negative air pressure during deceleration, etc.

Reference numeral 18 indicates a fuel injection valve which is driven and controlled by a control circuit (not shown). An air flow meter 17 is positioned in the intake passageway 3 and produces a detection signal indicative of the amount of intake air being passed therethrough. The control circuit adjusts the position of the valve 18 in response to the detection signal from the flow meter 17 thereby controlling the amount of fuel being injected into the intake passageway 3.

However, many problems exist in the construction of the above-described prior-art apparatus. Namely, the above-mentioned adjusting screw 7, electro magnetic valves 9 and 10, air regulator 13, and negative pressure control valve 5 as well as the bypass passageways 6, 8, 11 and 14 are independently connected to the intake passageway 3, and therefore, the layout of each member is complicated. Furthermore, their attachment is complicated and difficult since many air pipes are required. Consequently, smooth air flow cannot be obtained, and air is randomly supplied to the engine 2 since there are many air introducing portions.

Furthermore, many parts are required which causes the total weight of the apparatus to increase as well as requiring higher production costs.

SUMMARY OF THE INVENTION

The present invention intends to overcome the shortcomings of the prior art and has as its object to provide an auxiliary air supplying apparatus for an internal combustion engine which is light in weight and low in cost and, in which the overall layout of the apparatus is simple and easy to assemble.

Another object of the present invention is to provide an auxiliary air supplying apparatus for an internal combustion engine, in which a plurality of auxiliary air introducing portions are substantially centralized.

These and other objects of the present invention are accomplished by the provision of an auxiliary air supplying apparatus for an internal combustion engine to bypass throttle valves provided within an intake passageway, comprising an air box communicable with the intake passageway upstream of said throttle valves, and a plurality of auxiliary air passageways branched in parallel from said air box and connected to said intake passageway downstream of said throttle valves. The apparatus further includes means for controlling the flow rate of the air which flows through said passageways in accordance with the load conditions on the engine.

These and other objects, features and advantages of the present invention will be more apparent from the following description of preferred embodiments, taken in conjunction with the accompanying drawings.

DESCRIPTION OF PREFERRED EMBODIMENTS

Figure 1:
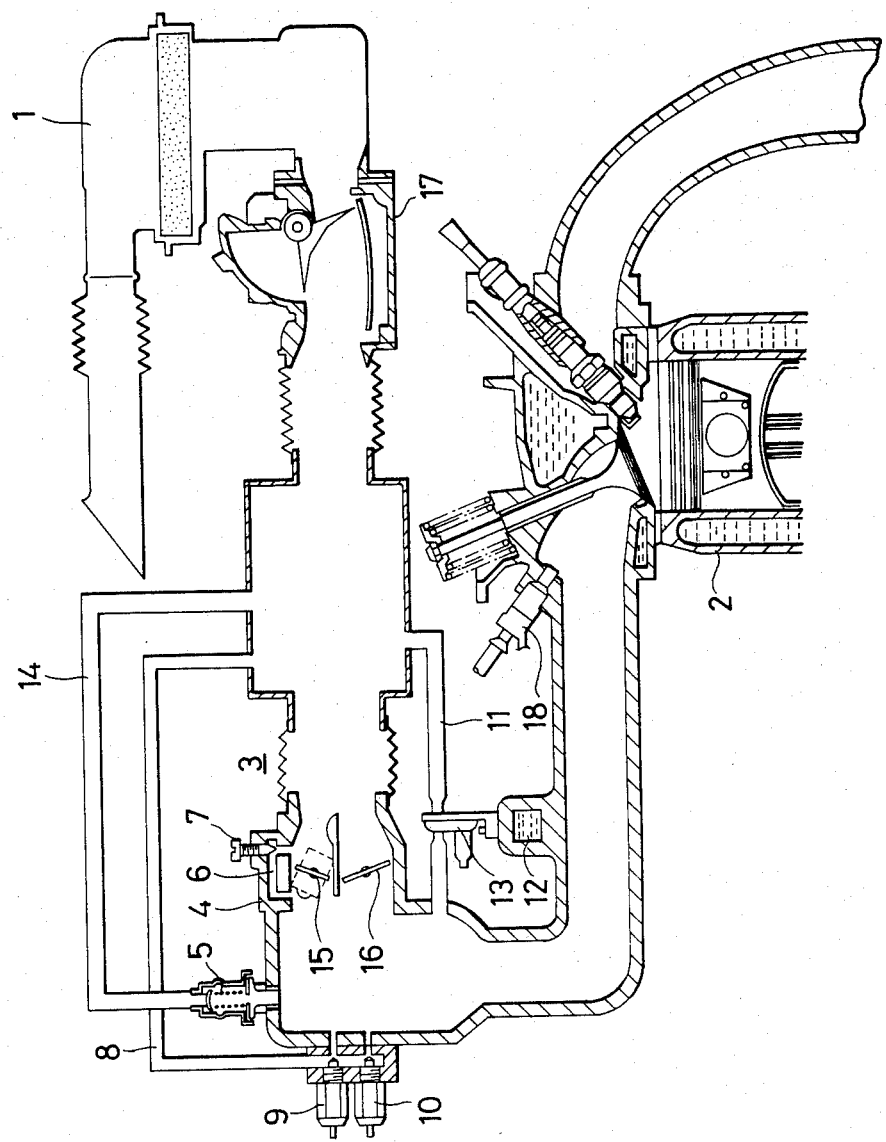
FIG. 1 is a schematic view of a conventional auxiliary air supplying apparatus.

In the drawings, similar or corresponding units, components or members are designated by similar reference numerals.

Figure 2:
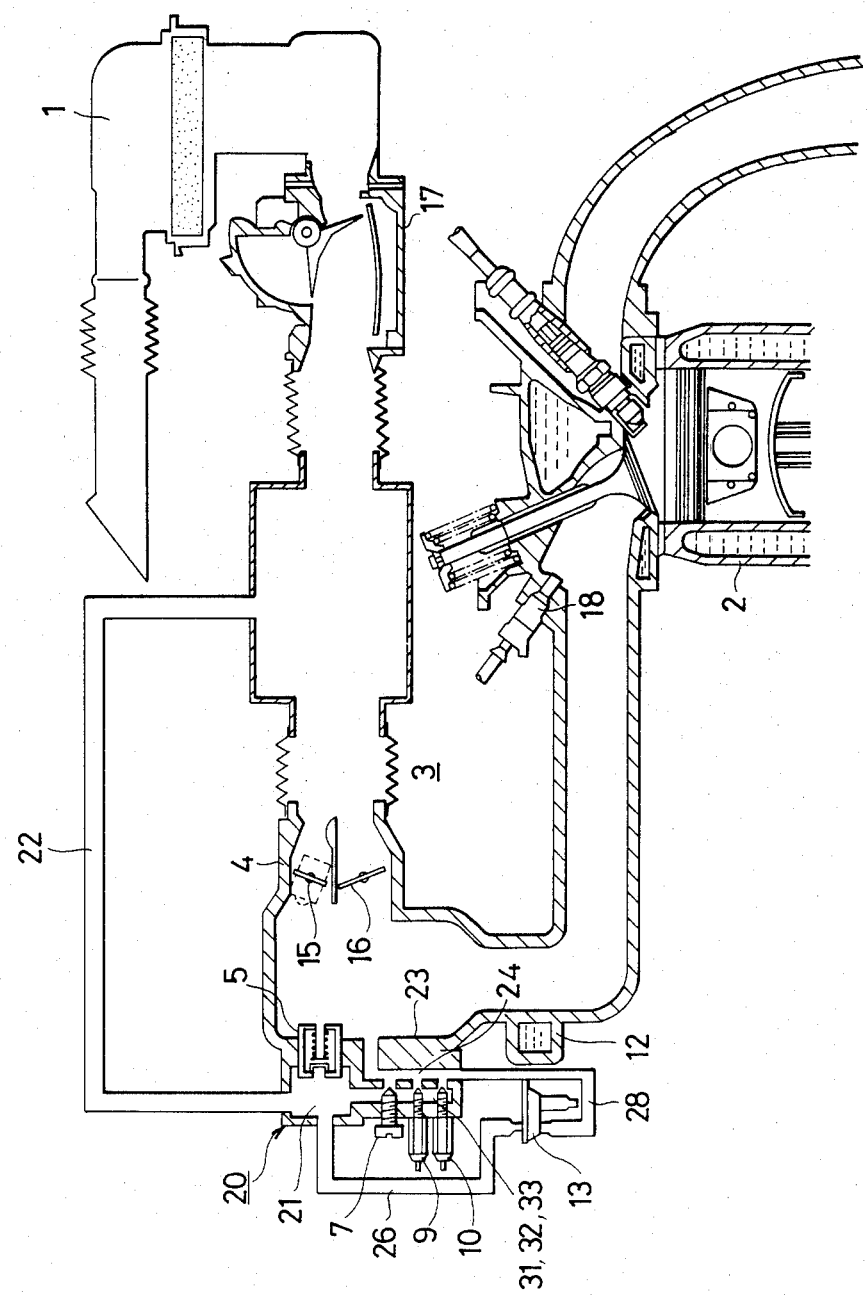
FIG. 2 is a schematic view of an embodiment of the auxiliary air supplying apparatus according to the present invention.

Referring to FIG. 2, air enters through an air cleaner 1 and is supplied to an engine 2 through an intake passageway 3. Throttle valves 15 and 16 are provided in a throttle chamber 4 which is formed along the intake passageway 3. The intake passageway 3 is further formed with a bypass passageway 22, one side of which is connected to an upstream side of the intake passageway 3, (to the right of the throttle valves 15 and 16 in FIG. 2) and the other side of which is connected to an air box 20 provided on the downstream side of the intake passageway 3 (to the left of the throttle valves 15 and 16).

A negative pressure control valve 5 is provided along a wall between the air box 20 and an external wall 23 of the intake passageway 3 so that it penetrates an air chamber 21 formed in the air box 20 and the intake passageway 3.

An upstream pipe 26 has one end thereof connected to the air box 20 and the other end thereof connected to the air regulator 13. A downstream pipe 28 has one end thereof connected to one end of a concentrated passageway 24 formed inside of the air box 20 and the other end thereof connected to the air regulator 13. The other end of the concentrated passageway 24 penetrates a wall along the air box 20 and the external wall 23 of the intake passageway 3. The air regulator 13 is opened or closed in response to the temperature of engine cooling water which circulates in a hot water radiating passageway 12 formed along the intake passageway 3.

Furthermore, a parallel communication consisting of three air passageways 31, 32 and 33 which connect the concentrated passageway 24 and the air chamber 21 is formed in the air box 20. These air passageways 31, 32 and 33 are provided with an idling air adjusting screw 7, and a pair of rotary correction electro magnetic valves 9 and 10 for controlling auxiliary air flow therethrough as a function of the electric loads and driving loads on the engine 2.

Figure 3:
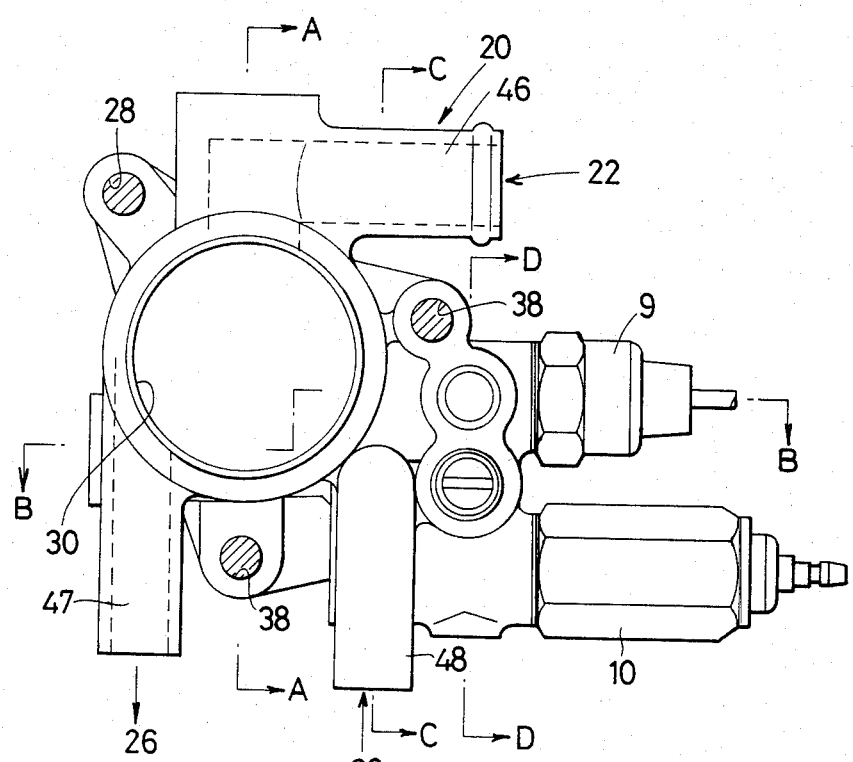
FIG. 3 is a front view of the air box utilized in FIG. 2.
Figure 5:
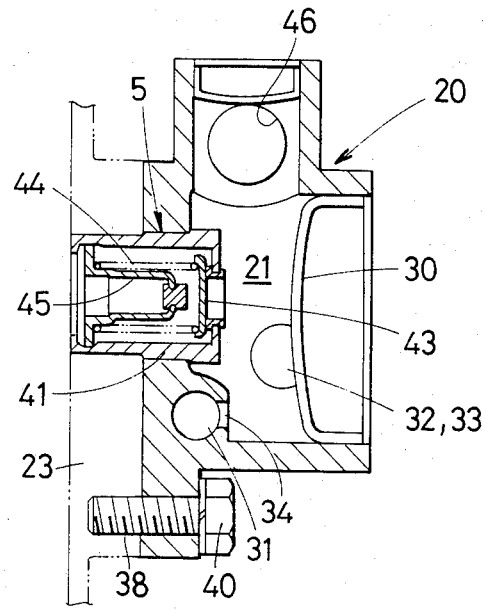
FIG. 5 is a cross sectional view taken along the line A—A of FIG. 3.

As can be seen from FIGS. 3 and 5, the air box 20 is attached to the external wall 23 of the intake passageway 3 by bolts 40 through three fitting threaded holes 38, which are formed in a housing 36 of the air box 20.

The air chamber 21 having a predetermined volume is formed in the above-mentioned housing 36, and one side of the air chamber 21 is blocked by a blind cover or cap 30.

Referring to FIG. 5, one end of the afore-mentioned negative pressure control valve 5 penetrates the other side of the air chamber 21 and is fixed thereto. The negative pressure control valve 5 is attached so that the other end thereof penetrates the external wall 23 of the intake passageway 3.

As shown in FIG. 5, the negative pressure control valve 5 comprises a valve housing 41, a valve seat 42, a valve body 43, a valve spring 44, a stopper 45, etc. When the intake negative pressure in the intake passageway 3 suddenly increases at the time of deceleration, the valve body 43 opens in the direction opposite to the air chamber 21 (namely, in the left direction of FIG. 5) against the valve spring 44. Thus, bypass auxiliary air is allowed to flow from the air chamber 21 into the downstream side of the intake passageway 3 via the negative pressure control valve 5.

Figure 4:
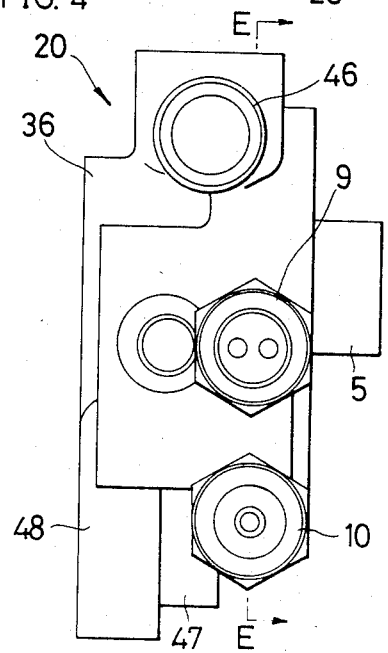
FIG. 4 is a side elevational view of the air box utilized in FIG. 2.

Two connectors 46 and 47 are formed in a body in the housing 36 so that they communicate with the air chamber 21 as shown in FIGS. 3 and 4. The connector 46 is connected to one end of the bypass passageway 22, the other end of which is connected to the upstream side of the intake passageway 3. The connector 47 is connected to one end of the upstream piping 26, the other end of which is connected to the already-described air regulator 13.

In addition, the concentrated passageway 24 communicable with the intake passageway 3 is formed in the housing 36.

Referring again to FIGS. 3, 4 and 7, another connector 48 is formed in a body in one end of the concentrated passageway 24. This connector 48 is connected to one end of the downstream pipe 28 of the air regulator 13.

Figure 9:
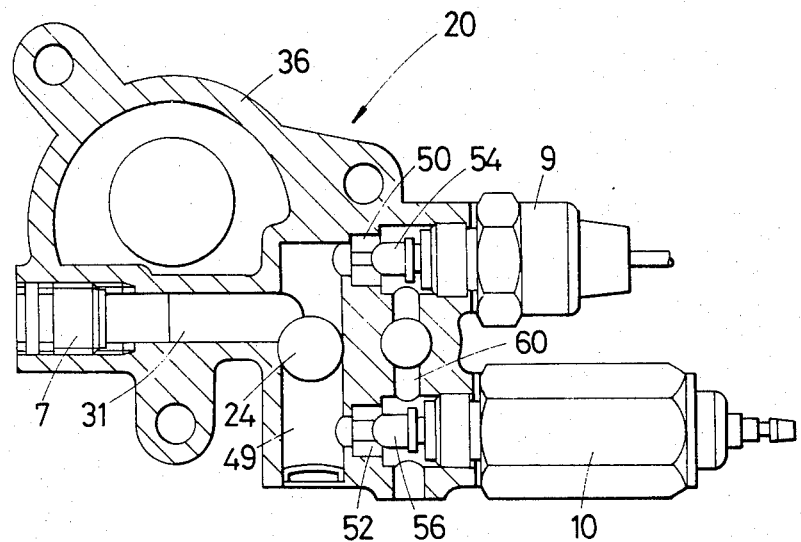
FIG. 9 is a cross sectional view taken along the line E—E of FIG. 4.

Referring to FIG. 9, the previously mentioned air passageway 31 for adjusting a quantity of idling air is formed horizontally in the housing 36. One end of the air passageway 31 is directly communicable with the concentrated passageway 24 and the other end thereof is communicable with the air chamber 21 through an air vent 34 (see FIGS. 5 and 6).

An adjusting screw 7 is threadably inserted from the outside of the housing 36 so that it is freely horizontally movable back and forth in the above-mentioned air passageway 31. The adjusting screw 7 is used to adjust the quantity of idling air passing through an air vent 34 by increasing and decreasing the opening area thereof.

Figure 6:
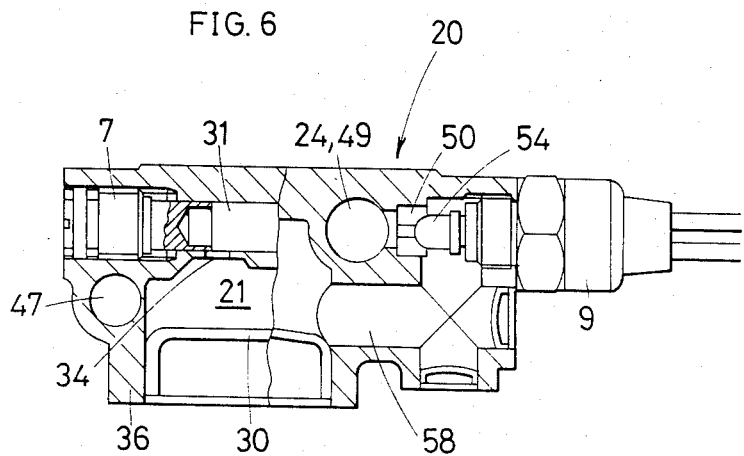
FIG. 6 is a cross sectional view taken along the line B—B of FIG. 3.

As shown in FIG. 6, an L-shaped passageway 58 is horizontally formed in the housing 36. As shown in FIG. 9, an elongated passageway 60 is further formed in the housing 36 and extends downwards from the aforementioned passageway 58. These passageways 58 and 60 are commonly used as part of the air passageways 32 and 33 for compensating for the idling rotating speed. One end of each of the air passageways 32 and 33 is communicated with the air chamber 21 and each of the other ends of the air passageways 32 and 33 is provided with air vents (fixed orifices) 50 and 52 which are formed upward and downward of the passageway 60, respectively.

Figure 7:
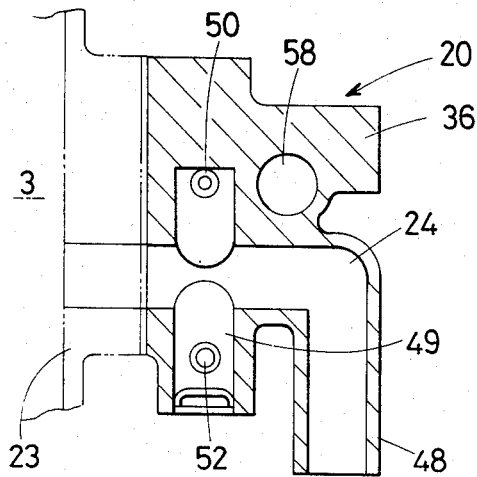
FIG. 7 is a cross sectional view taken along the line C—C of FIG. 3.

In FIGS. 6, 7 and 9, the air vents 50 and 52 are communicated with each other through a communicating passageway 49 which is formed in the afore-described concentrated passageway 24 and extends vertically in the housing 36.

Rotary correcting electro magnetic valves 9 and 10 are externally threadably attached to the housing 36. Valve bodies 54 and 56 for the magnetic valves 9 and 10 are formed on the side of the above-mentioned passageway 60. The valve bodies 54 and 56 move back and forth in the axial directions of the electro magnetic valves 9 and 10, i.e. in the left and right directions in FIG. 9, thereby allowing the electro magnetic valves 9 and 10 to open and close the afore-mentioned air vents 50 and 52, respectively.

The magnetic valve 9 is opened when the electric load increases. The magnetic valve 10 is opened when the driving load due to auxiliary apparatus increases. For this purpose, the air vent 50 which is opened and closed by the electro magnetic valve 9 is formed so that its opening area is smaller than that of the air vent 52.

Figure 8:
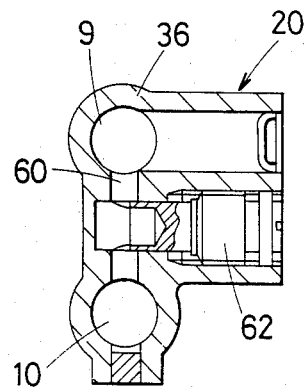
FIG. 8 is a cross sectional view taken along the line D—D of FIG. 3.

In this embodiment, as shown in FIGS. 3 and 8, an adjusting screw 62 is externally threadably inserted into the housing 36 so that it is horizontally feely movable back and forth therein. The adjusting screw 62 is positioned between the rotary correcting electro magnetic valves 9 and 10 in the above-mentioned passageway 60. The screw 62 is used as a secondary adjust to regulate the amount of auxiliary air flowing through the air vent 52 by increasing and decreasing the effective sectional area of the passageway 60.

When the air conditioner is used, for example, the decelerating rotating speed of the engine 2 fluctuates, so that a case arises where a correction rotating speed does not coincide with a predetermined idling rotating speed of the engine 2. Even in above mentioned case, the correction rotating speed of the engine 2 can be adjusted for so that it coincides with the predetermined idling rotating speed by supplying a sufficient quantity of auxiliary air.

As described above, when the engine 2 is driven, air which is inputed through the air cleaner 1 is passed through the intake passageway 3 and is then supplied to the engine 2 while controlling the flow rate of the air by the throttle valves 15 and 16.

A part of the air which flows in the intake passageway 3 upstream of the throttle valves 15 and 16 passes through the bypass passageway 22 (which is always communicated with the intake passageway 3) and into the air chamber 21 of the air box 20.

While the engine is idling, the throttle valves 15 and 16 are completely closed. At this time, the necessary auxiliary air passes through the air chamber 21 in the air box 20 to the air passageway 31, communicable with the air chamber 21, and through the air vent 34 to the concentrated passageway 24. The air is then supplied to the intake passageway 3 downstream of the throttle valves 15 and 16.

The quantity of idling air is adjusted for by the adjusting screw 7 threadably attached in the air passageway 31 in the air box 20.

When the head lights are turned ON while the engine is idling, the electric load increases; furthermore, when the air conditioner is used in this state, so that the driving load of the auxiliary apparatus also increases, both rotary correcting electro magnetic valves 9 and 10 in the air box 20 open to allow sufficient supplementary auxiliary air to flow into the engine 2.

In other words, auxiliary air is supplied to the engine 2 in order to correct the rotating speed thereof which decreases due to the above-mentioned increase in load. This auxiliary air is supplied through the air chamber 21 in the air box 20 and passed through the air passageways 32 and 33 (i.e. the passageways 58 and 60) which are communicable with the air chamber 21. This auxiliary air is then passed through the air vents 50 and 52 which are opened to the communicating passageway 49 and the concentrated passageway 24 and is then supplied to the intake passageway 3 downstream of the throttle valves 15 and 16 in the same way as described above.

On the other hand, in the case where the air regulator 13 is opened while the engine 2 is being warmed up during cold weather, additional auxiliary air is required to raise the idling rotating speed thereof. This auxiliary air is supplied through the air chamber 21 to the upstream pipe 26 communicable therewith, and passes through the air regulator 13, then downstream pipe 28 and is then returned to the concentrated passageway 24 in the air box 20, and supplied to the intake passageway 3 downstream of the throttle valves 15 and 16.

In case of deceleration, that is to say, when the throttle valves 15 and 16 are suddenly closed while the engine is rotating at a high speed (R.P.M), the intake negative pressure downstream of the throttle valves 15 and 16 suddenly increases. When this negative pressure exceeds a predetermined level determined by the valve spring 44 in the negative pressure control valve 5 (refer to FIG. 5), the valve body 43 in the control valve 5 opens. Hence, air in the air chamber 21 in the air box 20 is allowed to flow into the intake passageway 3 downstream of the throttle valves 15 and 16, so that an excessive increase of intake negative pressure is compensated for.

As described above, in this embodiment, almost all the auxiliary air in the air chamber 21 is supplied to the engine 2 through the internal passageways 31, 32, 33, etc. in the air box 20 by bypassing the throttle valves 15 and 16.

Therefore, in accordance with the present invention, there are advantages in that the number of air pipings is reduced and the number of parts required are also reduced remarkably. This is due to the simplification of the layout of the auxiliary air suppling apparatus which also results in the easy assembling of the parts thereof.

Furthermore, it also results in the reduction of total weight and production cost of the apparatus.

Moreover, there is an advantage in that the air distribution upon idling and the M.P.G. (i.e. the fuel efficiency) are also improved since the introducing portions for the auxiliary air are substantially concentrated in almost the same location in the intake passageway 3 downstream of the throttle valves 15 and 16.

Figure 10:
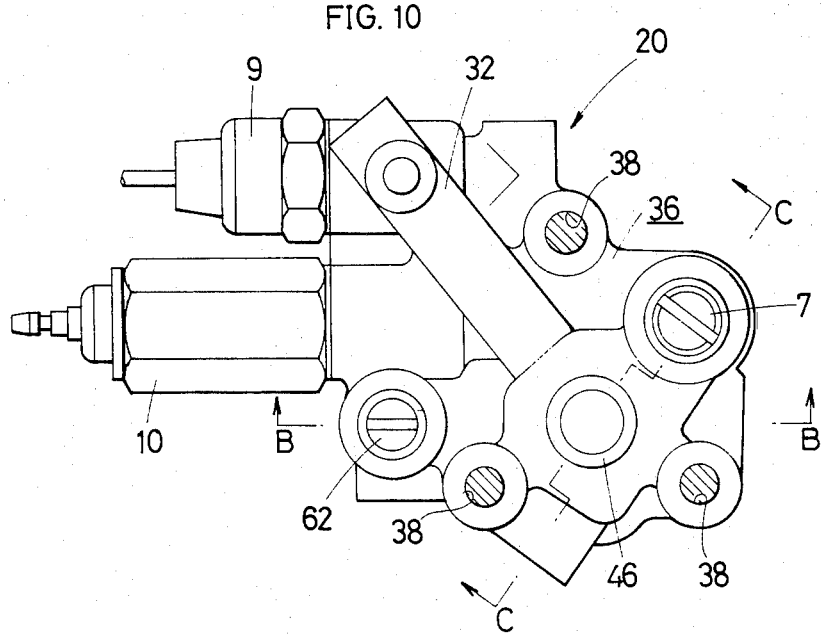
FIG. 10 is a front view of another embodiment of the present invention.
Figure 14:
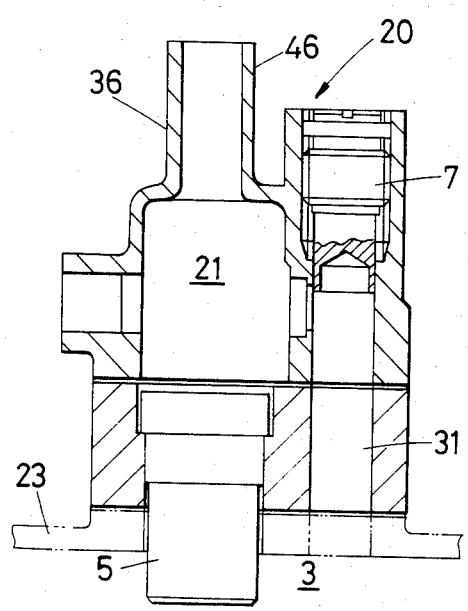
FIG. 14 is a cross sectional view taken along the line C—C of FIG. 10.

FIGS. 10 and 14 show another embodiment of the present invention.

Figure 11:
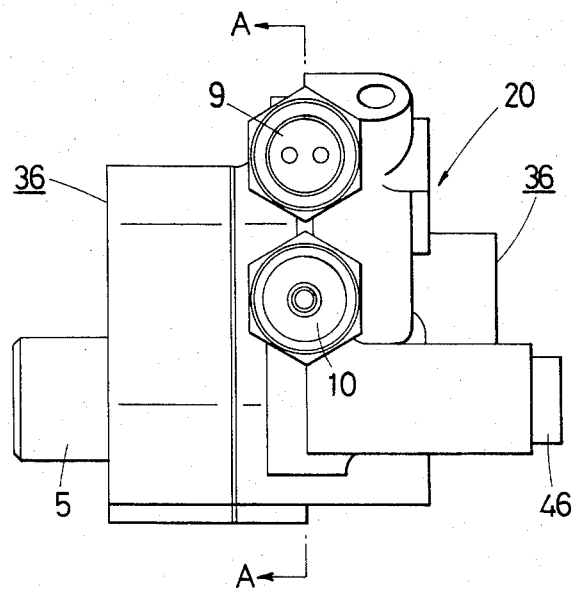
FIG. 11 is a side elevational view of the apparatus of FIG. 10.

This embodiment is almost the same as the first embodiment except that the housing 36 of the air box 20 is divided into two portions in the left and right directions in FIG. 11 thereby eliminating the blind cover of the air chamber 21, and that no bypass passageway for the air regulator 13 is provided.

Figure 12:
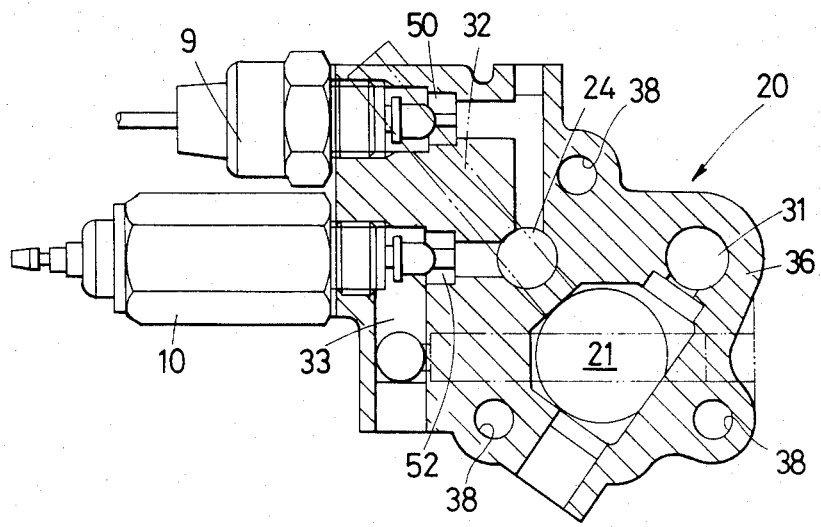
FIG. 12 is a cross sectional view taken along the lines A—A of FIG. 11.
Figure 13:
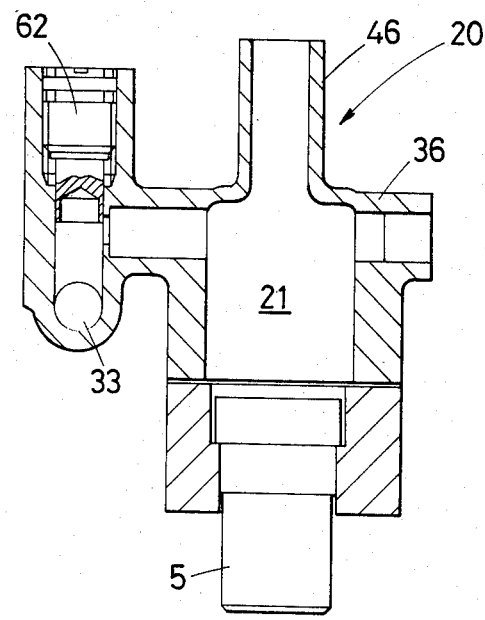
FIG. 13 is a cross sectional view taken along the line B—B of FIG. 10.

The air passageway 31 for adjusting the quantity of idling air is directly communicated with the intake passageway 3 downstream of the throttle valves 15 and 16 (see FIG. 14). The air passageways 32 and 33 for correcting the idling rotating speed of the engine 2 are independently branched from the air chamber 21 and are joined again to the downstream concentrated passageway 24 (refer to FIG. 12).

In this embodiment, the same effect as is the previous embodiment can be obtained.

Although preferred embodiments of the invention are specifically illustratd and described herein, it will be appreciated that many modifications and variations of the present invention are possible in light of the above teachings and within the purview of the appended claims without departing from the spirit and intended scope of the invention.

What is claimed is:

1. An auxiliary air supplying apparatus for an internal combustion engine having throttle valves disposed in an intake passageway, comprising,
   a bypass passageway having a first side connected to said intake passage upstream of said throttle valves,
   an air box connected to a second side of said bypass passageway,
   a plurality of auxiliary air passageways being branched in parallel between said air box and said intake passageway downstream of said throttle valves, and
   means for controlling the flow rate of air which flows respectively through said auxiliary passageways in accordance with operating conditions of the engine.

2. The auxiliary air supplying apparatus for an internal combustion engine as claimed in claim 1, wherein said air box is provided along an external side portion of the wall of said intake passageway downstream of said throttle valves.

3. The auxiliary air supplying apparatus for an internal combustion engine as claimed in claim 2, wherein said control means comprises:
   first regulating means attached to at least one of said auxiliary air passageways for regulating the flow of air passing through said at least one auxiliary air passageway in response to changes in the driving load of auxiliary apparatus;
   second regulating means interposed in another auxiliary air passageway for regulating the flow of air passing through said another auxiliary air passageway in response to temperature of cooling water of the engine; and
   third regulating means attached to a further auxiliary air passageway for regulating the flow of air through said further auxiliary air passageway to adjust the quantity of idling air.

4. The auxiliary air supplying apparatus for an internal combustion engine as claimed in claim 3, wherein the first regulating means comprises a pair of rotary correcting electro magnetic valves, the second regulating means comprising an air regulator, the third regulating means comprising an idling air adjusting screw.

5. The auxiliary air supplying apparatus for an internal combustion engine as claimed in claim 4, wherein the three air passageways are provided with the pair of rotary correction electro magnetic valves and the idling air adjusting screw.

6. The auxiliary air supplying apparatus for an internal combustion engine as claimed in claim 5, wherein the pipe comprises an upstream pipe and a downstream pipe, the upstream pipe having one end thereof connected to said air box and another end thereof connected to the air regulator, the downstream pipe having one end thereof connected to one end of the concentrated passageway and another end thereof connected to the air regulator.

7. The auxiliary air supplying apparatus for an internal combustion engine as claimed in claim 2, wherein a negative pressure control valve which is operated depending upon the pressure in said intake passageway is further provided so that it penetrates from said air box into said intake passageway through the external side portion of the wall of said intake passageway.

8. The auxiliary air supplying apparatus for an internal combustion engine as claimed in claim 1, wherein said auxiliary air passageways include a concentrated passageway having one end connected to other auxiliary air passageways and another end connected to said intake passageway downstream of said throttle valves.

9. The auxiliary air supplying apparatus for an internal combustion engine as claimed in claim 8, wherein said auxiliary air passageways further include a pipe and three air passageways, each of which has one end connected to said air box and another end connected to the concentrated passageway.

10. The auxiliary air supplying apparatus for an internal combustion engine as claimed in claim 9, wherein the three air passageways are provided with the pair of rotary correction electro magnetic valves and the idling air adjusting screw.

11. The auxiliary air supplying apparatus for an internal combustion engine as claimed in claim 10, wherein the pipe comprises an upstream pipe and a downstream pipe, the upstream pipe having one end thereof connected to said air box and another end thereof connected to the air regulator, the downstream pipe having one end thereof connected to one end of the concentrated passageway and another end thereof connected to the air regulator.

* * * * *